June 6, 1933.  L. J. PARKER  1,913,210
MIXING MACHINE
Filed Sept. 30, 1927   3 Sheets-Sheet 1

INVENTOR.
Linus J. Parker
BY Marechal and Noe
ATTORNEYS.

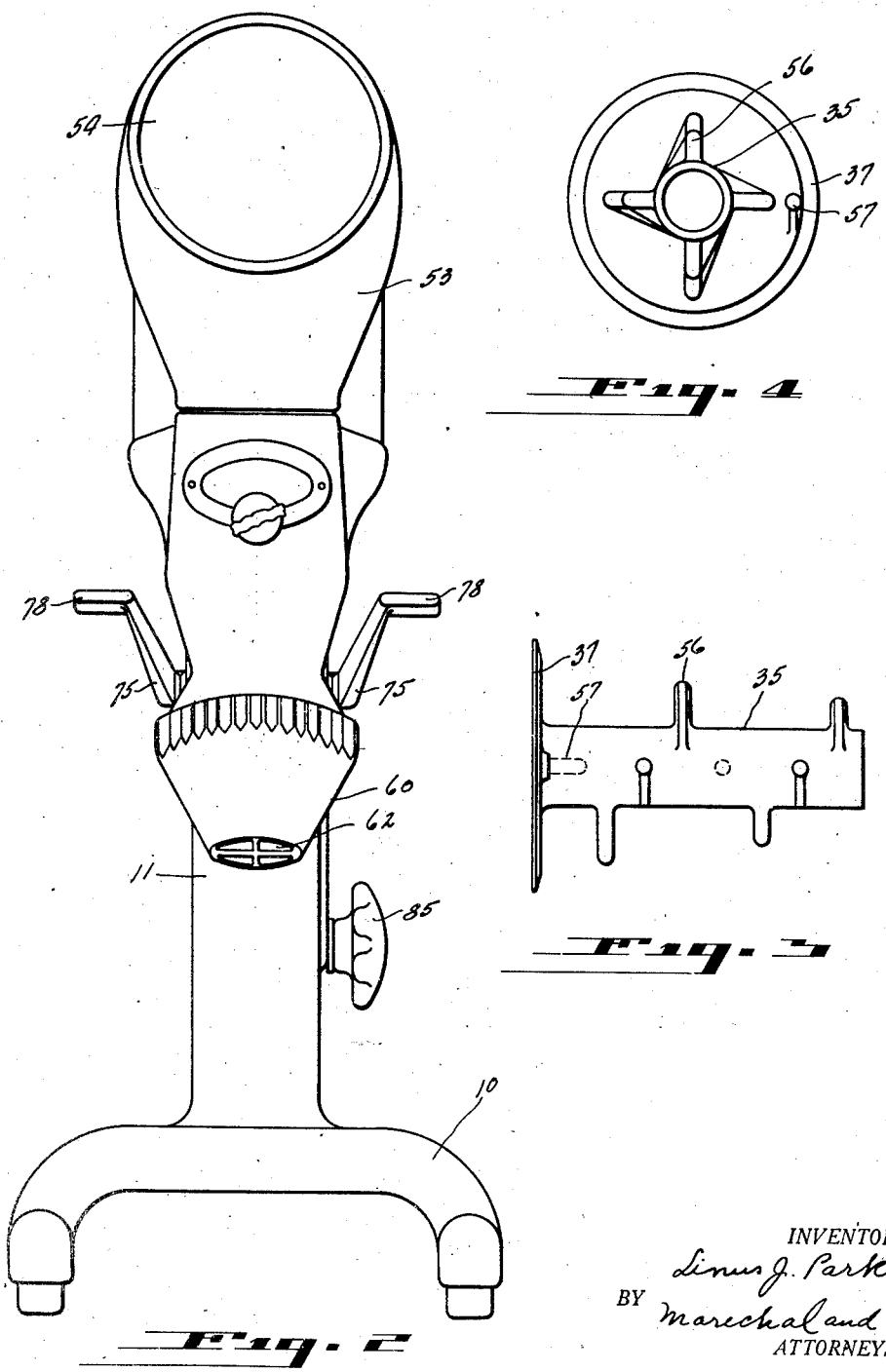

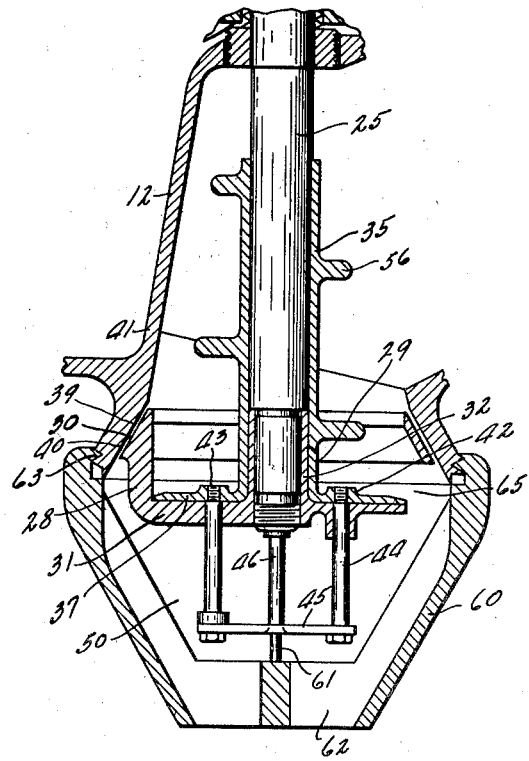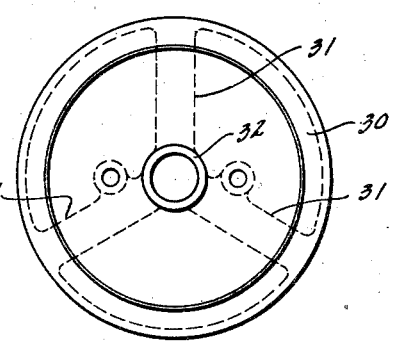

Patented June 6, 1933

1,913,210

UNITED STATES PATENT OFFICE

LINUS J. PARKER, OF DAYTON, OHIO, ASSIGNOR, BY MESNE ASSIGNMENTS, TO NORTH EAST APPLIANCE CORPORATION, OF ROCHESTER, NEW YORK, A CORPORATION OF NEW YORK

MIXING MACHINE

Application filed September 30, 1927. Serial No. 223,079.

This invention relates to machines for the disintegration, mixing or stirring of materials, and is particularly concerned with machines of this character adapted to handle foods or beverages of semi-solid or liquid state.

One object of the invention is the provision of a machine of this character embodying a rotor element and a stator element arranged in closely spaced relationship, and having provision providing for ease in cleaning so that materials or foodstuffs which have not passed through the machine may be removed.

Other objects and advantages of the invention will be apparent from the following description and from the drawings, in which,—

Fig. 2 is a front elevation of the machine;

Fig. 3 is a detail view of the movable rotor section;

Fig. 4 is an end view of the movable rotor section;

Fig. 5 is a central vertical section through the mixing chamber with the parts in their normal relation;

Fig. 6 is a section corresponding to Fig. 5 but showing the movable rotor element in its adjusted cleaning position; and Fig. 7 is a detail view of the peripheral rotor section.

Figure 1:
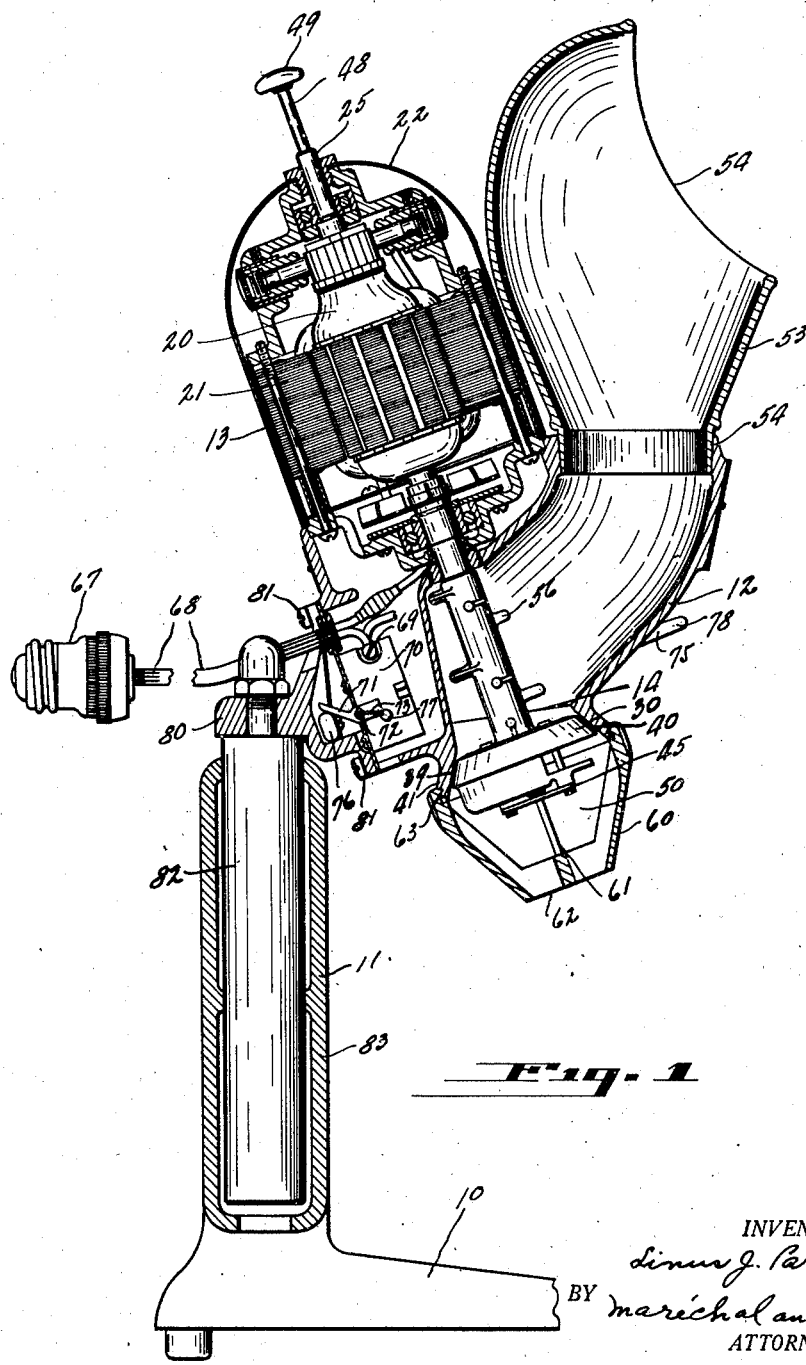
Fig. 1 is a central vertical section through the mixing machine embodying the present invention.

Referring more particularly to the drawings by reference numerals the machine represented in Figs. 1 and 2 comprises essentially a base 10 bearing pedestal 11, a mixing chamber 12, motor 13 and rotor element 14.

The motor 13 is a high speed electric motor of any suitable character and is shown as having an armature 20 and a stator 21, these parts being suitably mounted in an enclosing housing 22. This motor housing is positioned above and to one side of the mixing chamber 12 as shown, so that the motor shaft 25 on which the armature 20 is mounted, extends down into the lower portion of the mixing chamber.

Mounted on the lower portion of the motor shaft 25 is the rotor element designated generally 14 which is formed of the peripheral section 28 and the inner adjustable section 29. The peripheral section 28 is provided with a peripheral surface 30 of frusto-conical shape, this surface portion being mounted by means of three spaced downwardly extending supporting arms 31 and a central hub portion 32, on the lower end of the motor shaft 25 so that this section of the rotor is firmly attached to the motor shaft. The lower portion of the motor shaft also supports the adjustable element 29 which is shown as forming a part of one of the elements namely a rotor element, this adjustable element 29 being shown in the form of a flanged sleeve adapted to slide longitudinally along the lower portion of the motor shaft, and outside of the hub portion 32 of the peripheral section of the rotor element, these two parts having equal outside diameters as shown. The sleeve portion 35 of the adjustable rotor section 29 is flanged at its lower end so as to provide a disk or plate 37 which extends between the conical surface 30 and the hub portion 32 of the peripheral section of the rotor element. The flange or plate 37 thus closes the lower portion of the mixing chamber and forces the material which is placed in the mixing chamber to travel through the small space 39 between the surface 30 and the closely spaced correspondingly tapered conical surface 40 of the stator element 41 with which the rotatable rotor element cooperates. The flange or plate 37 is provided with bosses 42 in which are tightly fitted the reduced ends 43 of the two studs 44, the lower ends of which are connected to a tie strap 45 which is fastened at its center to the lower end of an adjusting rod 46 extending upwardly through a hollow bore in the motor shaft. The upper end of this rod projects as indicated at 48 from the upper end of the motor shaft 25 and carries a knob 49 which may be pressed downwardly from the position shown in Fig. 1 or raised to that position when desired. When the knob 49 is depressed from the position shown in Fig. 1 the rod 46 pulls the inner rotor section 35 down to the position shown in Fig. 6 without disturbing the spacing relation between the stator and the peripheral rotor elements, and the mixing chamber 12 is then in free communication with the discharge space 50 below it. When the knob 49 is pulled upwardly by the operator to again return the parts to the position shown in Figs. 1 and 5, the plate 37 will then be returned to its upper normal position closing off the communication between the mixing chamber 12 and the discharge space 50 except through the restricted conical passage 39 previously mentioned. It will be apparent that the motor is at all times connected so as to drive both the peripheral rotor section and the adjustable inner section regardless of the position of the latter. By reason of the arrangement just described it will be apparent that the adjustable section is adjusted quickly or practically instantaneously, the adjustable section being stopped at its proper position for effective operation when the knob 49 is raised. The arrangement which has been described, however, is not the only construction embraced by the present invention but other arrangements may be provided to relatively adjust a rotatable rotor section and a mixing chamber in a quick or instantaneous manner.

The materials to be mixed or disintegrated such as foodstuffs, vegetables, fruits or the like are introduced into the receiving hopper 53 which is provided with a receiving opening 54 on the upper side portion of the same. The lower end of the receiving hopper 53 fits within the upper part of the mixing chamber 12 as shown at 54 so that the food may travel down and be engaged by a series of projections 56 which extend radially outwardly from the sleeve 35 and which act upon the material so as to tear it apart and break it up and permit it to be further treated. The projections 56 are spaced around the sleeve portion 36 spirally and are of graduated sizes, the upper projection being small and the lower projection large in length and the projections between these extremes being graduated from one to the other in length so that the projections act on the solid or semi-solid parts of food introduced into the mixing chamber in a progressive manner and force the broken foodstuff downwardly in the manner of a screw. The disk or plate 37 is provided with one or more upwardly extending projections 57 which assists the projections 56 in tearing apart or mixing the food or food product introduced into the mixing chamber. After being acted upon by the various projections just mentioned the food or food mixture, then resting upon the upper surface of the plate 37, is whirled about very rapidly due to the high speed of rotation of the rotor element, and the liquid or semi-liquid portions of the food are thus forced to move out through the restricted passage 39 between the stator and rotor elements. Both of these mentioned elements have smooth surfaces which are preferably spaced apart a very small fractional part of an inch so that a complete mixing of the different materials fed into the mixing chamber is accomplished during the passage of the food at high speed through the restriction 39. The mixed product then flows down the inner walls of the discharge cap 60 which is provided with the guide ribs 61 so that the rapid whirling action of the mixture coming from the restriction 39 is slowed up, and the mixture caused to move downwardly in a smooth flow through the bottom opening 62 of the cap. The guide ribs as shown extend down along the inner surface of the cap and extend crosswise across the opening in the bottom of the cap through which the mixed material discharges so as to stop the whirling action. The cap 60 is threaded as at 63 so as to be easily removable, the threads being left-hand where the motor spins clockwise as viewed from the top to prevent vibrations and oscillations of the motor from causing the loosening of the cap.

During the operation just described the rod 48 is held in its upper normal position by its frictional engagement with the inner bore of the motor shaft, the rod being very slightly bent before assembly for this purpose. After the desired mixing has been accomplished, and it is desired to clean the machine and remove any material which may still be retained within the mixing chamber, such as seeds, stems and the like, the knob 49 is depressed causing the downward movement of the inner adjustable section and permitting the seeds or other material remaining within the mixing chamber to pass through the passage 65, see Fig. 6,—the seeds and other material being instantly thrown from the disk 37 which is still being rapidly rotated by the motor.

The motor is connected by means of an electrical attachment plug 67 to a suitable source of current which is fed through wires 68 one of which is connected as at 69 to a starting switch designated generally 70. This switch is operated to an "on" or closed position by a clockwise movement of a pivoted arm 71 which is pivoted at the point 72, a suitable spring 73 serving to return the lever to its original position as shown in Fig. 1. This lever is moved clockwise to cause the starting of the motor by means of the switch handle 75 which is substantially U-shaped so as to extend around and back of the housing and mixing chamber, where the rear part 76, when moved upwardly about the pivot axis 77, may cause the starting of the motor by closing the switch. Such a motion is imparted when the front legs 78 or either of them are depressed by the operator. After being so depressed to start the motor the latter continues in operation until the front legs 78 are released and at this time the action of the spring 73 in returning the arm 71 and the operating member 76 to their normal positions causes the switch to be moved to its "off" position to stop the motor.

The rear end of the mixing chamber is attached to a bracket 80 by means of bolts or screws 81, and this bracket is mounted on the upper end of a rod or plunger 82 which is guided within an enclosing sleeve or guide 83 forming the pedestal of the support. The rod 82 may be vertically adjusted within the sleeve 83 and may be positioned so that the discharge opening 62 of the mixing machine is the proper distance above the bottom of the base 10, by means of the hand operated lock member 85 which is threaded within the sleeve 83 and which when rotated moves into engagement with the rod 82 to fix it in any of its various positions of adjustment.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine of the class described comprising a motor, a rotor element driven thereby, a stator element having a surface in close relation to the rotor element, the rotor element including a bodily movable section adjacent said surface, and means for moving said movable section for the removal of material from said chamber.

2. A machine of the class described comprising a motor, a rotor element driven thereby, a material receiving element having a surface closely spaced from a peripheral portion of said rotor element, said rotor element having a section movable axially in relation to the said peripheral portion, and means for moving said section for the purpose described.

3. A machine of the class described comprising a motor, a rotor element mounted coaxially with said motor and driven thereby, a material receiving stator element having a surface closely spaced from a peripheral portion of said rotor element, said rotor element embodying an endwise movable section forming an inner part of the rotor element, and means manually operable to move said movable section endwise to permit cleaning of the material receiving element, said movable section having a series of projections adapted to engage material in the stator element.

4. A machine of the class described comprising a motor, a rotor element driven thereby, a stator element having a surface in close relation to the rotor element, said rotor element having a section bodily movable in relation to the peripheral portion thereof, and means located at the opposite end of the motor from the rotor element for manually adjusting the position of said movable section.

5. A machine of the class described comprising a motor, a motor shaft, a rotor element mounted on said shaft and embodying a peripheral section fixed to the shaft and a movable central section, a material receiving element having a surface closely spaced from the peripheral section of the rotor element, a rod extending through the motor shaft and connected to the movable section of the rotor element, and means at the opposite end of the motor from said rotor element for manually adjusting said rod to cause the endwise adjustment of the movable section without disturbing the spacing relation between the material receiving element and the peripheral portion of the rotor element.

6. A machine of the class described comprising a motor, a motor shaft, a rotor element mounted on said shaft and embodying a peripheral section fixed to the shaft and an inner sleeve section having a number of projections of graduated sizes along its length, a stator element cooperatively associated with the rotor element, and means for moving said sleeve section endwise without disturbing the spacing relation between the stator element and the peripheral section of the rotor element.

7. A machine of the class described comprising a motor, a rotor element driven thereby and comprising a peripheral conical surface, a hub portion, and arms attaching said surface to said hub portion, a stator element having a conical surface closely spaced from the said peripheral surface of the rotor element, an endwise movable section extending between the rotor hub and the peripheral portion of the rotor element, and means for moving said section without disturbing the spacing relation between said conical surfaces.

8. A machine of the class described comprising a motor, a rotor element driven thereby and comprising a conical surface, a hub portion, and spaced arms supporting said surface on said hub portion, a stator element having a conical surface closely spaced from the conical rotor surface, an endwise movable section extending between the rotor hub and the conical rotor surface, and means for moving said section without disturbing the spacing relation between said conical surfaces, said movable portion extending within the stator element and having a series of projections of graduated sizes for acting successively upon material introduced into the stator element.

9. A machine of the class described comprising a material receiving element, a material discharging element, a motor, a rotor element driven thereby, a stator element having a surface in close relation to the rotor element whereby the material to be mixed normally passes from the material receiving element between said surface and rotor element to said material discharging element to accomplish mixing, and means to permit such material to pass other than through said path for cleaning purposes, said means including an element associated with said rotor which is bodily movable to provide an opening of considerable size between said material receiving element and material discharging element.

10. A food mixing machine of the class described comprising a motor, a motor shaft, two-part rotor means driven thereby, a stator chamber having a surface in close relation to the rotor means, and mechanism movable coaxially through said motor shaft and connected to one part only of said rotor means for moving said part relatively to the other part of said rotor means a predetermined amount in an instantaneous manner to provide an opening of considerable size through which material in the chamber may be emptied.

11. A food mixing machine of the class described comprising a motor, a motor shaft, two-part rotor means driven thereby, a stator chamber having a surface in close relation to the rotor means, and mechanism movable coaxially through said motor shaft and connected to one part only of said rotor means for moving said part relatively to the other part of said rotor means a predetermined amount in an instantaneous manner to provide an opening of considerable size so that materials retained in the chamber may be emptied, said mechanism having provision for definitely limiting the relative positioning of said parts for effective operation.

In testimony whereof I hereto affix my signature.

LINUS J. PARKER.